United States Patent
Dang et al.

(10) Patent No.: US 11,410,061 B2
(45) Date of Patent: Aug. 9, 2022

(54) DYNAMIC ANOMALY REPORTING

(71) Applicant: ServiceNow, Inc., Santa Clara, CA (US)

(72) Inventors: Kanwaldeep K. Dang, Sammamish, WA (US); Anand Nikhil Mehta, Bellevue, WA (US); Kiran Kumar Bushireddy, Woodinville, WA (US); Swapnesh Patel, Bothell, WA (US); Bnayahu Makovsky, KirYat-Ono (IS)

(73) Assignee: ServiceNow, Inc., Santa Clara, CA (US)

( * ) Notice: Subject to any disclaimer, the term of this patent is extended or adjusted under 35 U.S.C. 154(b) by 307 days.

(21) Appl. No.: 16/721,629

(22) Filed: Dec. 19, 2019

(65) Prior Publication Data
US 2021/0004704 A1   Jan. 7, 2021

Related U.S. Application Data

(60) Provisional application No. 62/869,888, filed on Jul. 2, 2019.

(51) Int. Cl.
| | | |
|---|---|---|
| *G06F 3/0482* | (2013.01) | |
| *G06N 7/00* | (2006.01) | |
| *H04L 67/10* | (2022.01) | |
| *H04L 41/22* | (2022.01) | |
| *G06N 20/00* | (2019.01) | |

(52) U.S. Cl.
CPC ............. *G06N 7/00* (2013.01); *G06F 3/0482* (2013.01); *H04L 41/22* (2013.01); *H04L 67/10* (2013.01); *G06N 20/00* (2019.01)

(58) Field of Classification Search
CPC ........ G06N 7/00; G06N 20/00; G06F 3/0482; H04L 67/10; H04L 41/22
See application file for complete search history.

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 * | 11/2009 | Trinon .................. G06F 11/008 702/183 |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |

(Continued)

*Primary Examiner* — Anil K Bhargava
(74) *Attorney, Agent, or Firm* — Fletcher Yoder PC

(57) ABSTRACT

Systems and methods are provided for dynamic selection of anomaly detection options for particular metric data. Metric data corresponding to one or more configuration items of an information technology (IT) infrastructure is collected. A selected anomaly detection action option that applies to the metric data is identified. An action is performed using the metric data, based upon the selected anomaly detection action option. A dashboard graphical user interface (GUI) display results of the action.

19 Claims, 12 Drawing Sheets

(56) References Cited

U.S. PATENT DOCUMENTS

| | | | |
|---|---|---|---|
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 2004/0024571 A1* | 2/2004 | Trinon | G06F 11/324 702/186 |
| 2010/0037095 A1* | 2/2010 | Gerber | G06F 11/0709 714/15 |
| 2011/0238376 A1* | 9/2011 | Dang | G06F 11/3409 702/186 |
| 2013/0030761 A1* | 1/2013 | Lakshminarayan | G06F 11/0751 702/179 |
| 2013/0086587 A1* | 4/2013 | Naik | G06F 11/0781 718/100 |
| 2014/0189097 A1* | 7/2014 | Sidi | H04L 43/062 709/224 |
| 2016/0352766 A1* | 12/2016 | Flacher | H04L 67/10 |
| 2017/0111432 A1* | 4/2017 | Saini | H04L 67/22 |
| 2018/0123922 A1* | 5/2018 | Nataraj | H04L 41/0631 |
| 2020/0067952 A1* | 2/2020 | Deaguero | G06F 21/552 |

\* cited by examiner

| METRIC C | | | | | | | | | ⊙ oi ▸ Q | 1 TO 7 OF 7 ▲▼ |
|---|---|---|---|---|---|---|---|---|---|---|

440A

OPERATIONAL INTELLIGENCE
▽ CONFIGURE
METRIC CONFI RULES

| ≡ METRIC CONFIGURATION RULES | NEW | SYNC TO MID | SEARCH | ORDER ▽ | SEARCH | | | |
|---|---|---|---|---|---|---|---|---|
| ALL | ≡ NAME (444) | ≡ APPLIES TO (446) | ≡ CI SCOPE (448) | ≡ FILTER BY (452) | ≡ ORDER (450) | ≡ RULE (454) | ≡ SOURCE METRIC TYPES (456) | ≡ DOMAIN (458) |
| ⚙ | SEARCH | SEARCH | SEARCH | SEARCH | SEARCH | SEARCH | SEARCH | SEARCH |
| ☐ ⊖ | ad level itoa source | METRIC TO CI MAPPING (sa_metric_map) | | TRUE | 100 | sourceSTARTSWITHTOA^EQ | | GLOBAL |
| ☐ ⊖ | eviction size | METRIC TO CI MAPPING (sa_metric_map) | | TRUE | 100 | | metric_type_id=e3c3d422db4730011a45... | GLOBAL |
| ☐ ⊖ | ktestMetric0 | METRIC TO CI MAPPING (sa_metric_map) | | TRUE | 100 | | metric_type_id.source_metric_type.sys_id... | 15_MINUTE_RATE GLOBAL |
| ☐ ⊖ | test2 | METRIC TO CI MAPPING (sa_metric_map) | ALL CIS | TRUE | 100 | sourceLIKEAWS^EQ | | GLOBAL |
| ☐ ⊖ | aws ad action level | METRIC TO CI MAPPING (sa_metric_map) | | TRUE | 100 | | metric_type_id=e3c3d422db4730011a459... | GLOBAL |
| ☐ ⊖ | ktestMetric1 | METRIC TO CI MAPPING (sa_metric_map) | | TRUE | 100 | | metric_type_id.source_metric_type.tag_id... | GLOBAL |
| ☐ ⊖ | ad level | METRIC TO CI MAPPING (sa_metric_map) | | TRUE | 200 | | | GLOBAL |
| ☐ | ACTIONS ON SELECTED ROWS... ◆▸ | | | | | | | 1 TO 7 OF 7 ▲▼ |

DYNAMIC ANOMALY REPORTING

CROSS-REFERENCE TO RELATED APPLICATIONS

This application claims priority from and the benefit of U.S. Provisional Application Ser. No. 62/869,888, entitled "DYNAMIC ANOMALY REPORTING", filed Jul. 2, 2019, which is hereby incorporated by reference in its entirety for all purposes.

BACKGROUND

The present disclosure relates generally to detection and reporting of anomalies in information technology (IT) infrastructures. More specifically, the present disclosure relates to dynamic adjustment of reporting of anomaly data in anomaly reporting tools.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

With this in mind, an IT system may use historical data relating to time-series data to classify the time-series data based upon one or more data patterns of the time-series data. An underlying statistical model representative of the time-series data may be constructed based upon the relevant classifications. For example, the underlying statistical model may consider trends, seasonality, and/or other patterns that may be relevant to predicting expected subsequent time-series data values. As additional time-series data is received, it is compared with the underlying statistical model to identify statistical outliers in the time-series data. The statistical outliers are attributed an anomalous score, indicating an attributed magnitude of anomaly for the statistical outlier. The anomalous scores for the statistical outliers are then provided via the system, enabling anomaly reporting and/or remedial action.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As mentioned above, statistical outlier data may be identified and attributed to an anomaly. The present disclosure relates to the handling of this statistical data. More specifically, the present disclosure provides dynamically changeable actions for particularly identified anomalies and/or underlying metric data used to identify such anomalies.

Many different anomaly detection actions may be desirable to end users of anomaly detection tools. Using the techniques provided herein, different actions can be applied to different metrics. Thus, key metrics that may have a significant impact on the IT infrastructure may have a relatively stronger action than metrics that have a lesser impact on the IT infrastructure. Rather than merely always reporting an anomaly when a statistical outlier is detected in metric data, alternative actions could be implemented.

One action may include a "metrics only" action that does not report anomalies, but instead retains metric data without reporting, enabling the metric data to be investigated by IT personnel. As may be appreciated, a vast amount of metric data may be analyzed in the IT infrastructure. This option may be very useful to reduce attention to less important metric anomalies, as the metric data is merely retained, but no anomaly scores or other anomaly detection processing is prescribed when this option is used.

In some instances, a particular action of an available set of actions may be selected without human intervention based upon particular characteristics of the metric data, a statistical model used to characterize the metric data, etc. As may be appreciated, the "metrics only" option may be quite useful when a statistical model used to identify statistical outliers does not meet qualitative requirements. For example, when the statistical model is unable to identify an anomaly with a probability that meets a defined threshold of certainty, false anomalies may be reported, diverting attention of IT personnel from true anomalies that may be impacting the IT infrastructure. Accordingly, one of the features of the present disclosure includes automatic anomaly detection action selection based upon an evaluation of the underlying statistical model associated with the metric data. For example, when the underlying statistical model associated with particular metric data does not meet a qualitative threshold, the "metrics only" option may be automatically selected from the list of available anomaly detection actions without human intervention. This may ensure that statistical bounds and anomaly scores, anomaly alerts and/or IT alerts are not generated based upon a qualitatively-deficient statistical model. Additionally and/or alternatively, machine learning may be employed to identify patterns of human selection of this option and may automatically select and apply this option for certain metric data based upon the identified patterns. In one example, a behavioral pattern may indicate that particular metric data is interacted with in a similar way (e.g., similar amount of interaction, similar time of interaction, etc.) as other metrics with the current anomaly detection action selected. Based upon this pattern, the particular metric data may be automatically set to this anomaly detection action.

Another action that may be provided is a "bounds" option, which, when applied to particular metric data, may generate statistical upper and lower bounds for the particular metric data, while refraining from further anomaly reporting. This option may utilize more processing resources than the "metrics only" option, as an analysis of bounds is generated for the particular metric data. However, this option may also mitigate the use of IT resources on less important metric data, as no anomaly scores are generated or reported for metric data with this action option applied to it.

In some embodiments, the "bounds" option may be automatically selected in certain situations. For example, when a metric has been identified as a low priority metric and/or when a statistical model has met a qualitative threshold, the "bounds" option may be automatically selected without human selection of the option for application to the particular metric data. Additionally and/or alternatively, machine learning may be employed to identify patterns of human selection of this option and may automatically select and apply this option for certain metric data based upon the identified patterns. In one example, a behavioral pattern may indicate that particular metric data is interacted with in a similar way (e.g., similar amount of interaction, similar time of interaction, etc.) as other metrics with the current anomaly detection action selected. Based upon this pattern, the particular metric data may be automatically set to this anomaly detection action.

Another action that may be provided is an "anomaly scores" option, which, when applied to metric data, generates anomaly scores for the metric data. An anomaly score indicates an attributed magnitude of anomaly for the statistical outlier. Generation of anomaly scores is described in detail in U.S. Patent Pub. No. 2019/0102276, entitled, "Systems and methods for robust anomaly detection," which was filed on Nov. 16, 2017, which is hereby incorporated by reference in its entirety.

In some embodiments, the "anomaly scores" option may be automatically selected in certain situations. For example, when a metric has been identified as a low-to-medium priority metric and/or when a statistical model has met a qualitative threshold, the "anomaly scores" option may be automatically selected without human selection of the option. Additionally and/or alternatively, machine learning may be employed to identify patterns of human selection of this option and may automatically select and apply this option for certain metric data based upon the identified patterns. In one example, a behavioral pattern may indicate that particular metric data is interacted with in a similar way (e.g., similar amount of interaction, similar time of interaction, etc.) as other metrics with the current anomaly detection action selected. Based upon this pattern, the particular metric data may be automatically set to this anomaly detection action.

Another action that may be provided is an "anomaly alerts" option, which, when applied to metric data, generates anomaly alerts for the metric data when generated anomaly scores for the metric data meet or exceed an anomaly score threshold. This option may be useful for drawing attention to particular anomalies (e.g., medium-to-high anomalies), by proactively providing an alert via a user interface (e.g., a graphical user interface (GUI)).

In some embodiments, the "anomaly alerts" option may be automatically selected in certain situations. For example, when a metric has been identified as a medium-to-high priority metric and/or when a statistical model has met a qualitative threshold, the "anomaly alerts" option may be automatically selected without human selection of the option. Additionally and/or alternatively, machine learning may be employed to identify patterns of human selection of this option and may automatically select and apply this option for certain metric data based upon the identified patterns. In one example, a behavioral pattern may indicate that particular metric data is interacted with in a similar way (e.g., similar amount of interaction, similar time of interaction, etc.) as other metrics with the current anomaly detection action selected. Based upon this pattern, the particular metric data may be automatically set to this anomaly detection action.

Another action that may be provided is an "IT alerts" option, which, when applied to metric data, generates anomaly alerts for the metric data when generated anomaly scores for the metric data meet or exceed an anomaly score threshold. This option may be useful for drawing attention to particular anomalies (e.g., high priority anomalies), by proactively providing an alert via a relatively higher-priority user interface (e.g., a graphical user interface (GUI)) than the user interface used by the "anomaly alerts" option. For example, this user interface may generate an incident (e.g., an investigation and/or mitigation task for completion by IT personnel) based upon the IT alert. This may facilitate IT personnel attention to the detected anomaly.

In some embodiments, the "IT alerts" option may be automatically selected in certain situations. For example, when a metric has been identified as a high priority metric and/or when a statistical model has met a qualitative threshold, the "IT alerts" option may be automatically selected without human selection of the option. Additionally and/or alternatively, machine learning may be employed to identify patterns of human selection of this option and may automatically select and apply this option for certain metric data based upon the identified patterns. In one example, a behavioral pattern may indicate that particular metric data is interacted with in a similar way (e.g., similar amount of interaction, similar time of interaction, etc.) as other metrics with the current anomaly detection action selected. Based upon this pattern, the particular metric data may be automatically set to this anomaly detection action.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 7 and 8 are schematic diagrams of a graphical user interface (GUI) for providing specialized metrics configuration rules, in accordance with aspects of the present disclosure;

DETAILED DESCRIPTION

Figure 1:
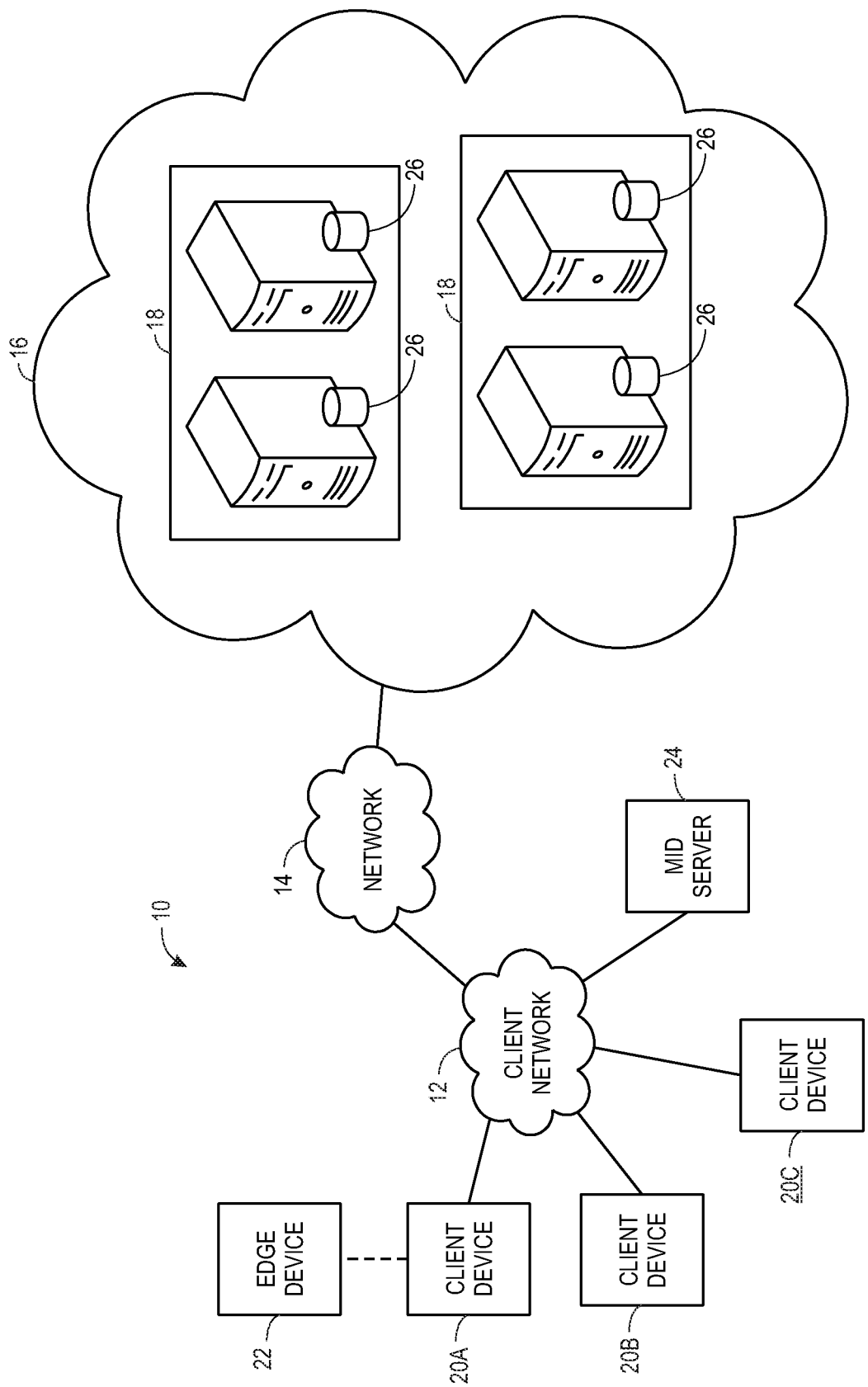
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB. As used herein, the terms alerts, incidents (INTs), changes (CHGs), and problems (PRBs) are used in accordance with the generally accepted use of the terminology for CMDBs. Moreover, the term "issues" with respect to a CI of a CMDB collectively refers to alerts, INTs, CHGs, and PRBs associated with the CI.

As mentioned above, the present disclosure relates to dynamically changeable anomaly detection options for metric data of an IT infrastructure. The IT infrastructure may be monitored, resulting in metric data (e.g., time-series data concerning configuration items (CIs)) that may be stored in a configuration management database (CMDB). Anomaly detection processing may be performed on the metric data and particular actions may be performed in the anomaly detection processing. Different metrics may be treated differently (e.g., based upon different setting selected for different metric data). For example, in some instances, the metric data may be captured without further anomaly detection processing. In some instances, upper and/or lower bounds for the metric data may be derived for certain metric data, while other anomaly detection processing is not performed. For other metric data, anomaly scores (e.g., an indication of a magnitude of deviation between the current time-series data and the underlying statistical model over multiple measurements of the current time-series data, over a particular time interval, or both). In some instances, anomaly alerts and/or IT alerts may be generated. Anomaly alerts provide an indication of a detected anomaly and IT alerts associated with an anomaly provide an indication that an investigative and/or remedial action may be warranted based upon the detected anomaly.

The particular anomaly detection action for particular metric data may be selected via a graphical user interface (GUI). In some embodiments, the particular anomaly detection action for the particular metric data may be automatically selected via computer-implemented instructions based upon particular criteria and/or conditions being met with regard to the metric data, an underlying statistical model associated with the metric data, etc. In some instances, machine learning or other artificial intelligence may be used to identify selections from the anomaly detection options to be applied to particular metric data.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
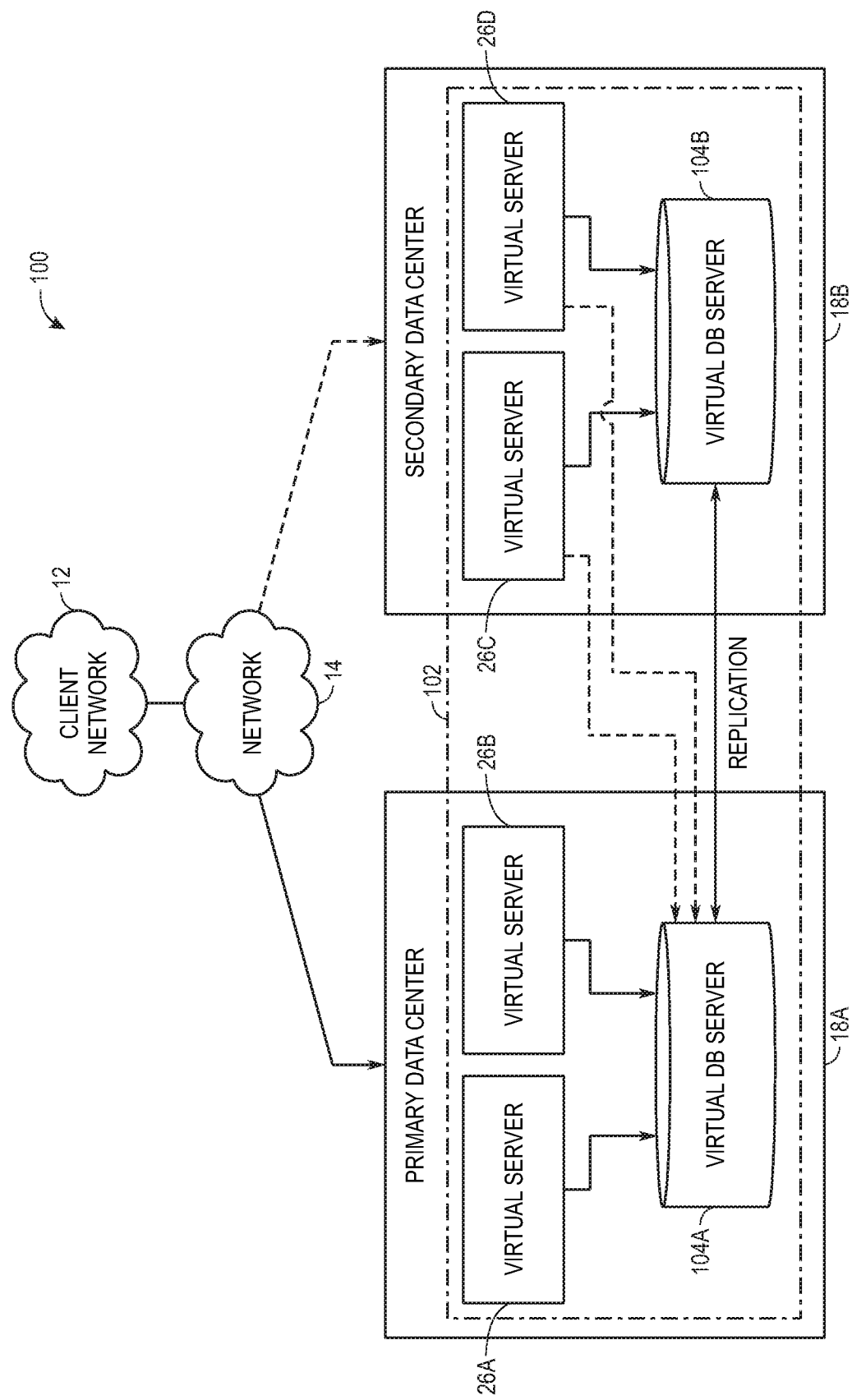
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
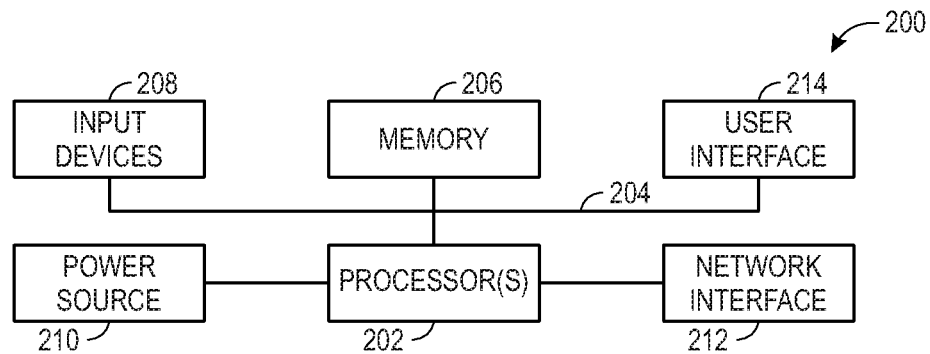
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. In some embodiments, the instructions may be pipelined from execution stacks of each process in the memory 206 and stored in an instruction cache of the one or more processors 202 to be processed more quickly and efficiently. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
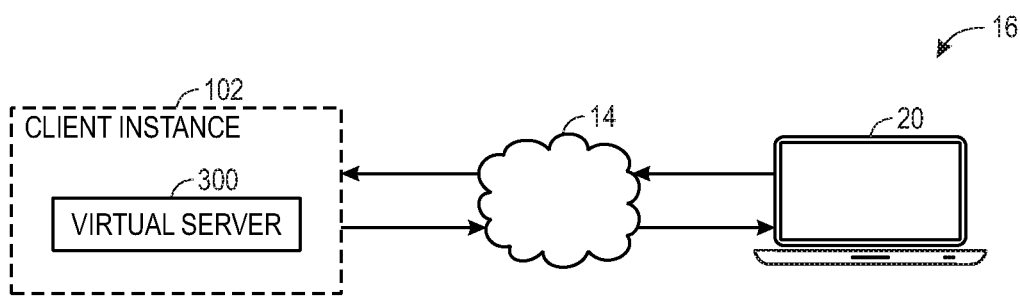
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 230 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
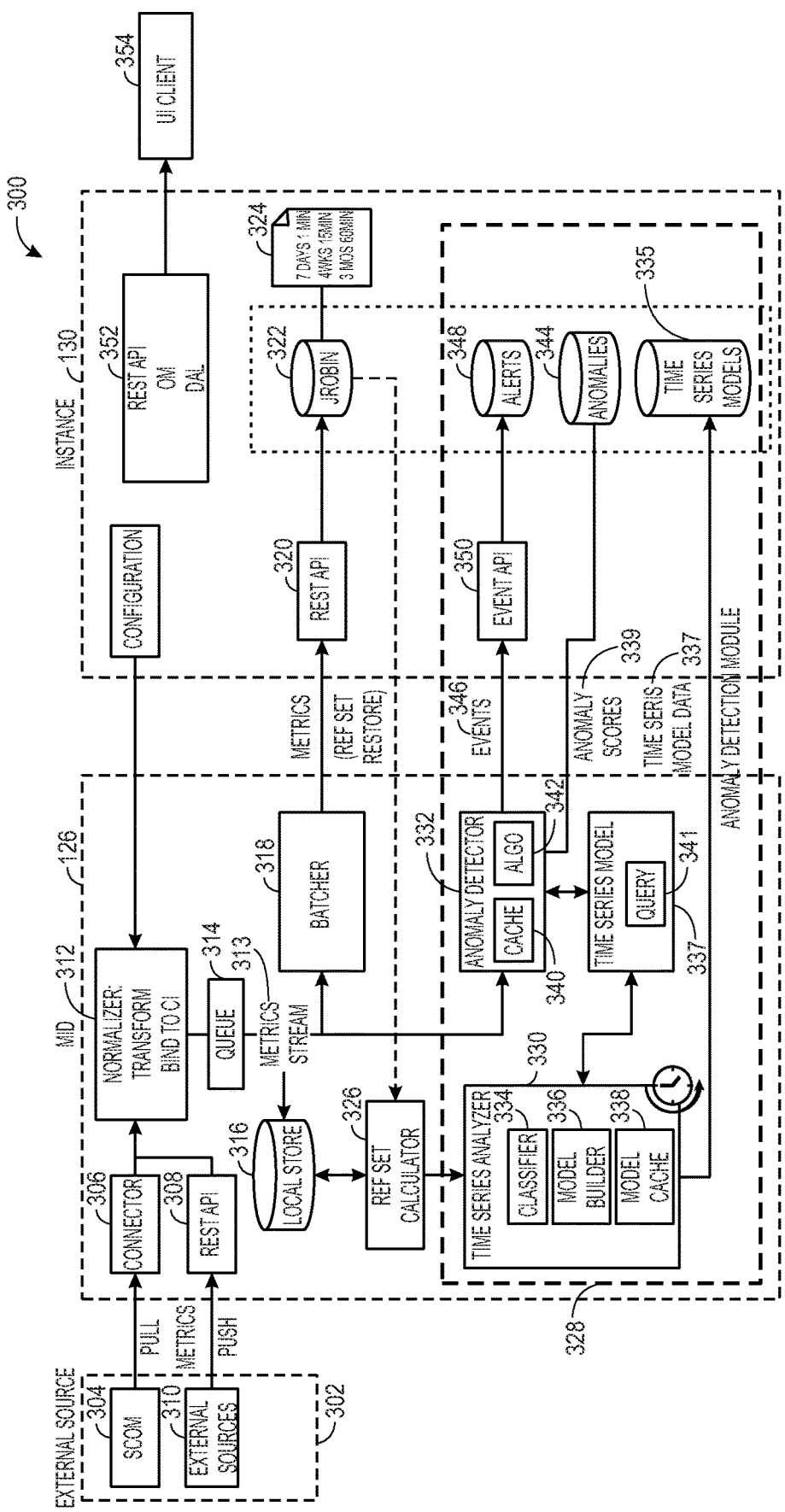
FIG. 5 is a block diagram of an example anomaly detection system that may be part of the cloud architecture of FIG. 1, in accordance with aspects of the present disclosure.

With the foregoing in mind, FIG. 5 illustrates a distributed computing system 300, in accordance with an embodiment. As mentioned above, the system 300 includes a MID server 126A and/or 126B communicatively coupled to instance 130 (e.g., running in the cloud-based platform 16 of FIG. 1). Additionally, in the current embodiment, external sources 302 are present. The external sources provide time-series data, which may indicate metrics for services, devices, and operations (e.g., the CIs of FIG. 1). For example, operations management software, such as System Center—Operations Manager (SCOM) 304 may be communicatively coupled to a distributed cache 127 communicatively coupled to the connector logic 306 of the MID server 126A and/or 126B, enabling the MID server 126A and/or 126B to pull metric data for many computers, services, etc. from a single console. Additionally, in the current embodiment, the MID server 126A or 126B hosts a Representational State Transfer (REST) application-programming-interface (API) 308, which enables additional external sources 310 to push metric data regarding the CIs to the MID server 126A and/or 126B from the distributed cache 127.

As mentioned above, once the metric data is received at the distributed cache 127, a determination as to the relevant MID server 126A and/or 126B of the cluster 129 that is assigned to process the metric data may be determined using a CI 110 processing assignment and CI 110 IDs associated with the metric data (e.g., via the distributed cache 127). The distributed cache 127 may forward the metric data to relevant MID server 126A and/or 126B (e.g., by reading out the data to the MID server 126A and/or 126B via a data push via the REST API 308).

Once metric data (e.g., time-series data) is received by the MID server 126A or 126B, normalizer logic 312 may bind the metric data/time-series data to a relevant CI. In the current embodiment, the normalized metrics are provided to a queue 314 for subsequent analysis/processing. For example, a stream 313 of time-series/metric data is provided from the queue 314 to a local data store 316, which stores a copy of the queued time-series data.

Further, for anomaly detection, it may be useful to obtain a certain amount of historical data. The batcher logic 318 may provide the stream 313 of time-series/metric data to a REST API 320 of the instance 130 in batches. The REST API 320 may provide the time-series/metric data to a journal and time-series database 322 (e.g., a round-robin database (RRD), such as JROBIN and/or MetricBase and/or other time-series database).

The time-series database 322 may be a time-series database that stores time-series data. As mentioned above, the time-series data may include properties regarding the CIs, such as network bandwidth, temperature, CPU load, and so forth, acquired at periodic or arbitrary intervals. The time-series database 322 may be circular buffer based databases that collect data at different times. The time-series data may be stored in a round-robin archive, in multiple round-robin archives, or the like. Generally, the time-series database 322 may continuously collect data (e.g., time-series data) along with date/time stamps recording the date and time in which each data item was received. After the time-series data has been collected, the time-series database 322 may be queried to retrieve a subset of the time-series data related to the query.

The time-series data may be a series type that is characterized as a "FLOAT_SIGNAL," which may be a series of {instant, value} with a discrete fixed time period, continuous dense values (e.g., each value is stored, missing intermediate values are interpolated), and numeric values stored as floats (e.g., 32 bit float representation). As such, the time-series data may measure performance properties (e.g., transaction count, transaction time, duration, counts) of components such as the CPU, memory, or the like. In addition, the time-series data may include data related to non-numeric values (e.g., string, bit fields, choices), numeric types other than floats (e.g., double, integer, decimal), non-periodic or sparse data (e.g., events), sub-second resolutions, multi-dimensional types (e.g., coordinates), and the like.

In some embodiments, instructions may be implemented to collect data (e.g., metrics) having a particular name, types, retention schedule 324 (e.g., 7 days at 1 minute intervals, 4 Weeks at 15 minute intervals, 3 Months at 1 hour intervals), and the like. As such, a dimension that details a name, type, and retention schedule for monitored properties, a time range including a start and end date, and the like may be provided, resulting in provision of the time-series data in accordance with the instructions (e.g., from the appropriate database(s), sensors, or the like).

In addition to the components described above, Reference Set Calculator 326 may be a processor-based component that receives the resultant time-series data from the time-series database 322 and aggregates the data for subsequent use as reference data for the anomaly detection module 328.

The anomaly detection module 328 includes a time-series analyzer 330 and an anomaly detector 332. In the illustrated embodiment, the time-series analyzer 330 and the anomaly detector 332 are logic (e.g., machine-readable instructions) executed on the MID server 126A or 126B. In alternative embodiments, the time-series analyzer 330 and/or the anomaly detector 332 may be executed on alternative servers/computers.

As mentioned above, for anomaly detection, it may be useful to obtain a certain amount of historical data. The anomaly detector 332 of each MID server 126A and 126B may include a cache 340 that is used to cache metric data that it receives. Accordingly, to ensure that the proper metric data is sent to proper cache 340, as mentioned above, the metric data may be distributed, from the distributed cache 127, to the proper MID server 126A and/or 126B. This may help to ensure that the anomaly detector 332 receives all relevant metric data for CI 110 metric data that it is tasked with processing.

In some embodiments, such as when analyzing for seasonality, the reference data may include at least two weeks of historical time series data. Additionally and/or alternatively, in some embodiments, when providing alternative analysis, the reference data may include less data. For example, the reference data may include at least 30 data points, which may correlate to 7.5 hours of fifteen-minute averages. The amount of accumulated reference data may change based upon implementation details. For example, an amount of reference data may vary based upon a type of time-series database 322 that is used (e.g., JROBIN vs. MetricBase and/or other time-series database).

Using the reference data from the reference set calculator 326, the time-series analyzer 330 may at periodic intervals, determine a classification from a pre-determined set of classes, for incoming time-series data (e.g. the stream 313 of time-series/metric data). To do this, classifier logic 334 of the time-series analyzer 330 may analyze the reference data received from the reference set calculator 326 to determine one or more patterns, trends, or other characteristics of the data, which indicate a particular classification from the set of classes.

After classification is complete, model builder logic 336 of the time-series analyzer 330 may construct an underlying statistical model representative of the stream 313 of time-series data based at least upon the determined classification. For example, the stream 313 may be characterized according to one or more features based upon a particular classification. The underlying statistical model 337 may be stored in the model cache 338 and a time-series models data store 335 of the instance 130.

Once the underlying statistical model is generated, the underlying statistical model 337 may be used to project an expected trend T(t) and seasonality S(t) forward for a time period (e.g., a week) and may also be used to compute upper and lower control limits as T(t)+S(t)±nσ, where is configurable but, in some embodiments, will default to 3, giving the 99% confidence interval if the residual is actually normal. The model query component 341 may return these limits at any time during the time period (e.g., the week).

The anomaly detector 332 may monitor the stream 313 of time-series/metric data. As mentioned above, the metric stream may include metric data that is read out from the distributed cache 127 to a relevant MID server 126A and/or 126B that is assigned to process the metric data. Accordingly, in some embodiments, a subset of the data received at the distributed cache 127 may be distributed as the metrics stream 313 of MID server 126A and a subset of the data received at the distributed cache 127 may be distributed as the metrics stream 313 of MID server 126B.

The anomaly detector 332 identifies statistical outliers of a current stream 313 of the time-series/metric data, by performing a statistical analysis on the stream 313 of the time-series/metric data based at least in part upon the underlying statistical model 337 constructed by the time-series analyzer 330. Upper bounds and/or lower bounds may also be used to determine the outliers. For example, data may be determined to be an outlier if it falls outside the range of the upper bounds to the lower bounds.

The outliers, however, do not necessarily constitute anomalies for the system 300. For example, an event with a probability of 0.01% per minute will occur about once a week in minute-level data. Accordingly, the anomaly detector 332 tracks the history of these outliers (e.g., in the cache 340) and based upon this history, determines an anomalous score 339 for the statistical outliers (e.g., via the algorithm 342). The anomalous score 339 may provide a representation of a magnitude of deviation between the current time-series data and the underlying statistical model over multiple measurements of the current time-series data, over a particular time interval, or both. For example, observing ten 0.01% events in an hour may result in a high anomalous score. The anomalous score 339 may be stored in an anomalies data store 344 at the instance 130 and/or may be presented to a client communicatively coupled to the system, for subsequent reporting, client action, or both. Additionally, when the anomaly score is above a determined threshold, the anomaly detector 332 may raise events 346 by providing the events 346 to an alerts data store 348 (e.g., via an event API 350). As depicted, the events 346, anomaly scores 339, time-series model data 337, and/or data from the time-series database 322 may be presented, via an API 352 (e.g., a REST API), to a user-interface client 354 (e.g., for reporting and/or remedial action).

Figure 6:
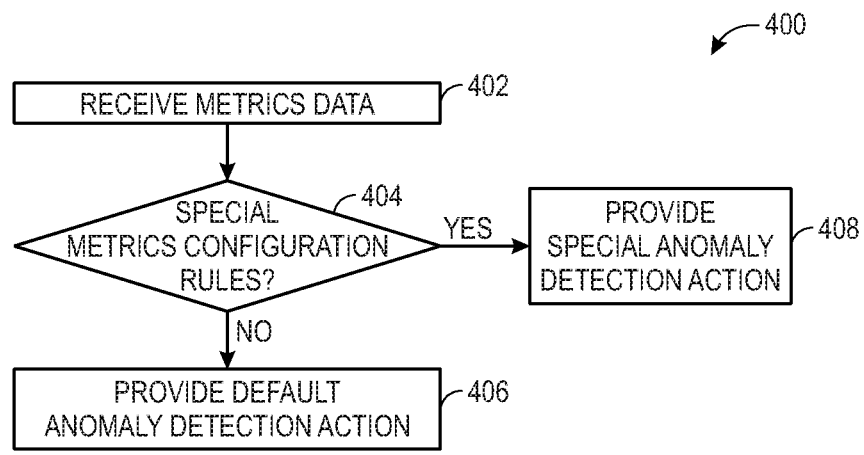
FIG. 6 is a flowchart illustrating a process for providing specialized metrics configuration rules for particular metrics data, in accordance with aspects of the present disclosure.

FIG. 6 is a flowchart illustrating a process 400 for providing specialized metrics configuration rules for particular metrics data, in accordance with aspects of the present disclosure. The process 400 begins with receiving metrics data (block 402). A detailed discussion of receiving metric data/time-series data is provided above with respect to FIG. 5.

Figure 8:
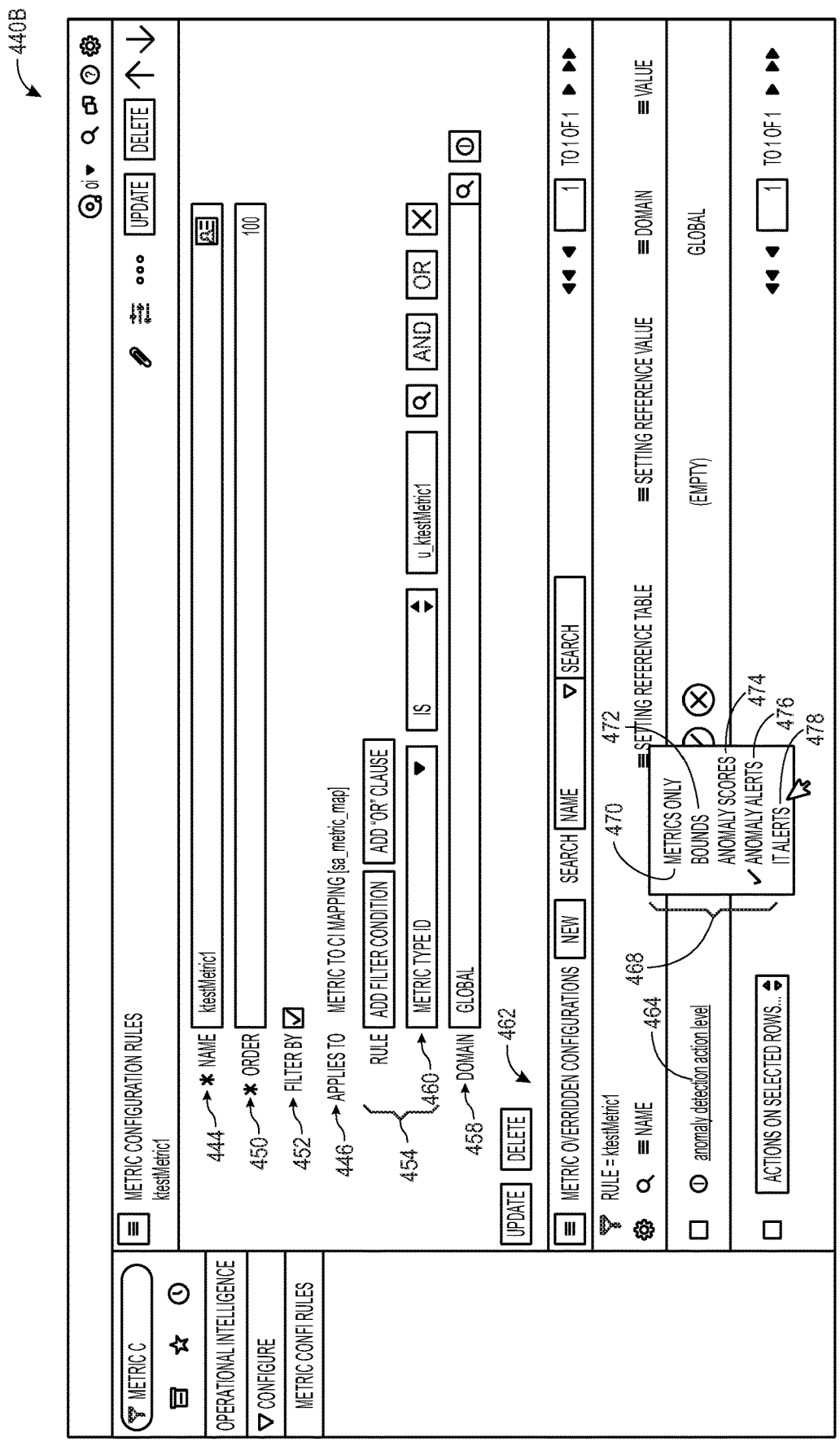
Figure 14:
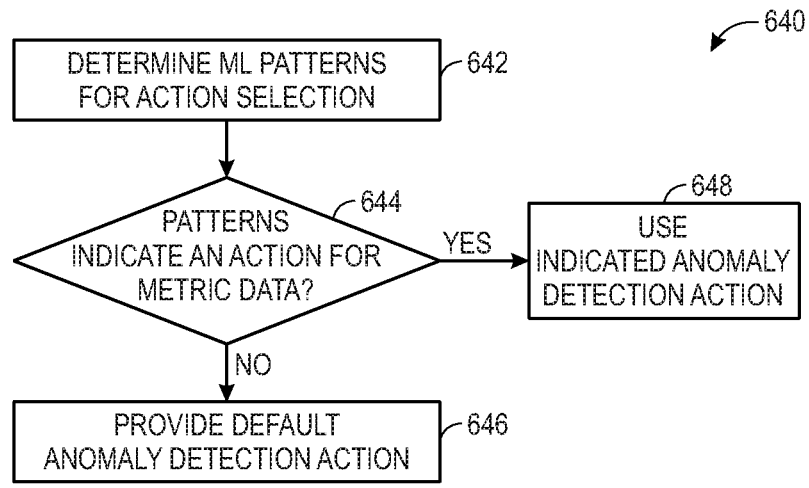
FIG. 14 is a flowchart illustrating a process for using machine learning for assigning anomaly detection action options, in accordance with aspects of the present disclosure.
Figure 15:
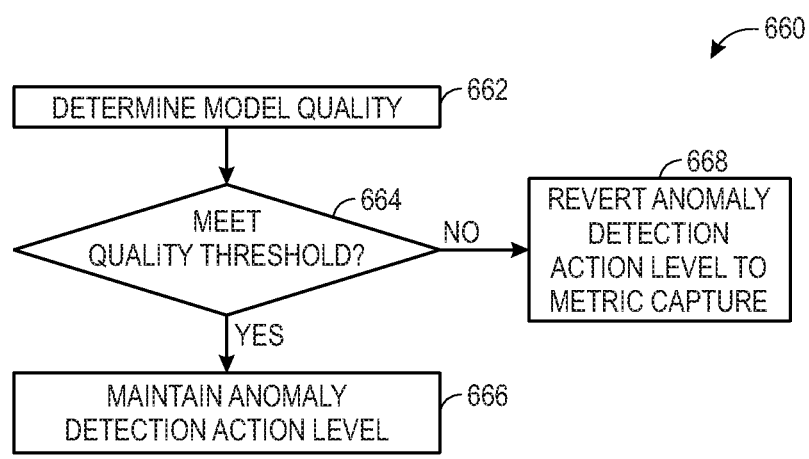
FIG. 15 is a flowchart illustrating a process for assigning anomaly detection action options based upon a model quality, in accordance with aspects of the present disclosure.

Next, a determination is made as to whether special metrics configuration rules exist for the particular metric data that is received (decision block 404). For example, FIGS. 7 and 8 are schematic diagrams of a graphical user interface (GUI) 404A and 404B for user-provision of specialized metrics configuration rules, in accordance with aspects of the present disclosure. FIGS. 14 and 15 provide machine-automated provision of specialized metrics configuration rules, in accordance with aspects of the present disclosure. The specialized metrics configuration rules discussed with regard to FIGS. 7, 8, 14, and 15 relate primarily to adjustment of anomaly detection action options, in line with the present disclosure. However, other specialized metric configuration items could also be adjusted.

When no specialized metrics configuration rules are present, default anomaly detection actions are used (block 406). However, when specialized metrics configuration rules related to anomaly detection actions are present, the specialized anomaly detection action that is specified for the particular metric data is used (block 408).

The discussion now turns to specification of specialized metric rules for particular metric data. As illustrated in GUI 440A of FIG. 7, specialized metrics rules 442 may be provided for particular metric data. GUI 440B of FIG. 8 provides for detailed specialized metric rule configuration. These specialized metrics rules 442 override default handling of incoming metric data.

The "name" field 444 provides a rule name for the specialized metric rules 442. For example, as illustrated in GUI 440B, a specialized metric rule name of "ktestMetric1" is provided.

The "applies to" field 446 provides an indication of which configuration settings tables will be used to specify CIs with which to override default configuration rules by the specialized metrics rules 442. For example, as illustrated in GUI 440B, the current specialized metric rule applies to the "Metric to CI Mapping [sa_metric_map]" table. The "CI scope" field 448 identifies particular CIs of the table specified in the location of the applies to field 446 with which the specialized metric rules 442 apply.

The "order" field 450 enables specification of a rule priority within all other rules, where higher numbers represent higher priorities. For example, as illustrated in the GUI 440B, the "order" field 450 is null. In such case, the order of this rule may be set to a lowest priority (e.g., 100, as indicated in GUI 440A of FIG. 7).

The "filter by" field 452 indicates whether or not the "rule" field 454 is used for a particular specialized metric rules 442. The rule field 454 provides conditions for CIs to meet for the rule to apply. For example, as illustrated in GUI 440B, the "filter by" field 452 is checked, enabling the rule fields 454. A filter condition 460 for the current specialized metric rule is provided, such that the rule will only apply when the metric type id equals u_ktestMetric1 is provided.

Source metric types 456 and domains 458 for the specialized metric rules 442 may also be provided. For example, as illustrated in GUI 440B, the "domain" field 458 is set to global.

The particular configuration items to override may be specified in the "Metric overridden configuration" section 462 of GUI 440B of FIG. 8. Here, default configuration values may be modified. Of particular interest for the present disclosure, an "anomaly_detection_action_level" configuration setting 464 may be specified for override for the metric data that is specified. This configuration setting 464 may be used to dynamically alter an anomaly detection action that is taken for the specified metric data.

As mentioned above, many different anomaly detection action options 468 may be provided. One action may include a "metrics only" action option 470 that does not report anomalies, but instead merely retains metric data, which can be investigated by IT personnel. As may be appreciated, a vast amount of metric data may be analyzed in the IT infrastructure. This option may be very useful to reduce attention to less important metric anomalies, as the metric data is merely retained, but no anomaly scores or other anomaly detection processing is prescribed when this option is used.

Another action that may be provided is a "bounds" action option, 472 which, when applied to particular metric data, may generate statistical upper and lower bounds for the particular metric data, while refraining from further anomaly reporting. This option may utilize more processing resources than the "metrics only" option, as an analysis of bounds is generated for the particular metric data. However, this option may also mitigate the use of IT resources on less important metric data, as no anomaly scores are generated or reported for metric data with this action option applied to it.

Another action that may be provided is an "anomaly scores" action option 474, which, when applied to metric data, generates anomaly scores for the metric data. An anomaly score indicates an attributed magnitude of anomaly for the statistical outlier. Generation of anomaly scores is described in detail in U.S. Patent Pub. No. 2019/0102276, entitled, "Systems and methods for robust anomaly detection," which was filed on Nov. 16, 2017, which is hereby incorporated by reference in its entirety.

Another action that may be provided is an "anomaly alerts" action option 476, which, when applied to metric data, generates anomaly alerts for the metric data when generated anomaly scores for the metric data meet or exceed an anomaly score threshold. This option may be useful for drawing attention to particular anomalies (e.g., medium-to-high anomalies), by proactively providing an alert via a user interface (e.g., a graphical user interface (GUI)).

Another action that may be provided is an "IT alerts" action option 478, which, when applied to metric data, generates anomaly alerts for the metric data when generated anomaly scores for the metric data meet or exceed an anomaly score threshold. This option may be useful for drawing attention to particular anomalies (e.g., high priority anomalies), by proactively providing an alert via a relatively higher-priority user interface (e.g., a graphical user interface (GUI)) than the user interface used by the "anomaly alerts" option. For example, this user interface may generate an incident (e.g., an investigation and/or mitigation task for completion by IT personnel) based upon the IT alert. This may facilitate IT personnel attention to the detected anomaly.

Figure 9:
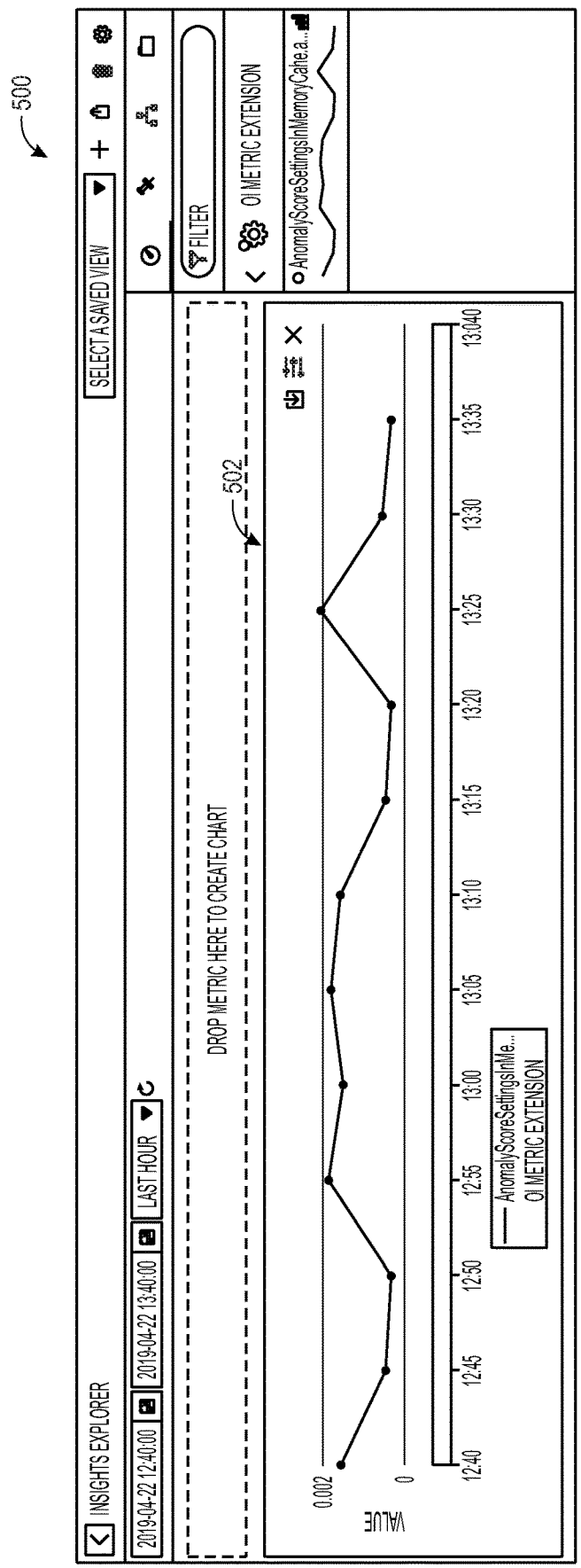
FIG. 9 illustrates an output for metric data associated with a "metrics only" anomaly detection action option, in accordance with aspects of the present disclosure.

By enabling dynamic selection of particular action options 468, particular anomaly detection actions may be provided for different metric data. FIGS. 9-13 provide schematic illustrates of different GUIs to illustrate the results of selection of each of the options 468. Starting first with the "metrics only" action option 470, FIG. 9 illustrates a GUI 500 providing an output for metric data associated with a "metrics only" anomaly detection action option 470, in accordance with aspects of the present disclosure. As illustrated, metric data 502 is provided without further bounds, anomaly scores, etc. No alerts are generated for this data, as anomaly scoring, detection and alerting is not enabled for this metric data.

Figure 10:
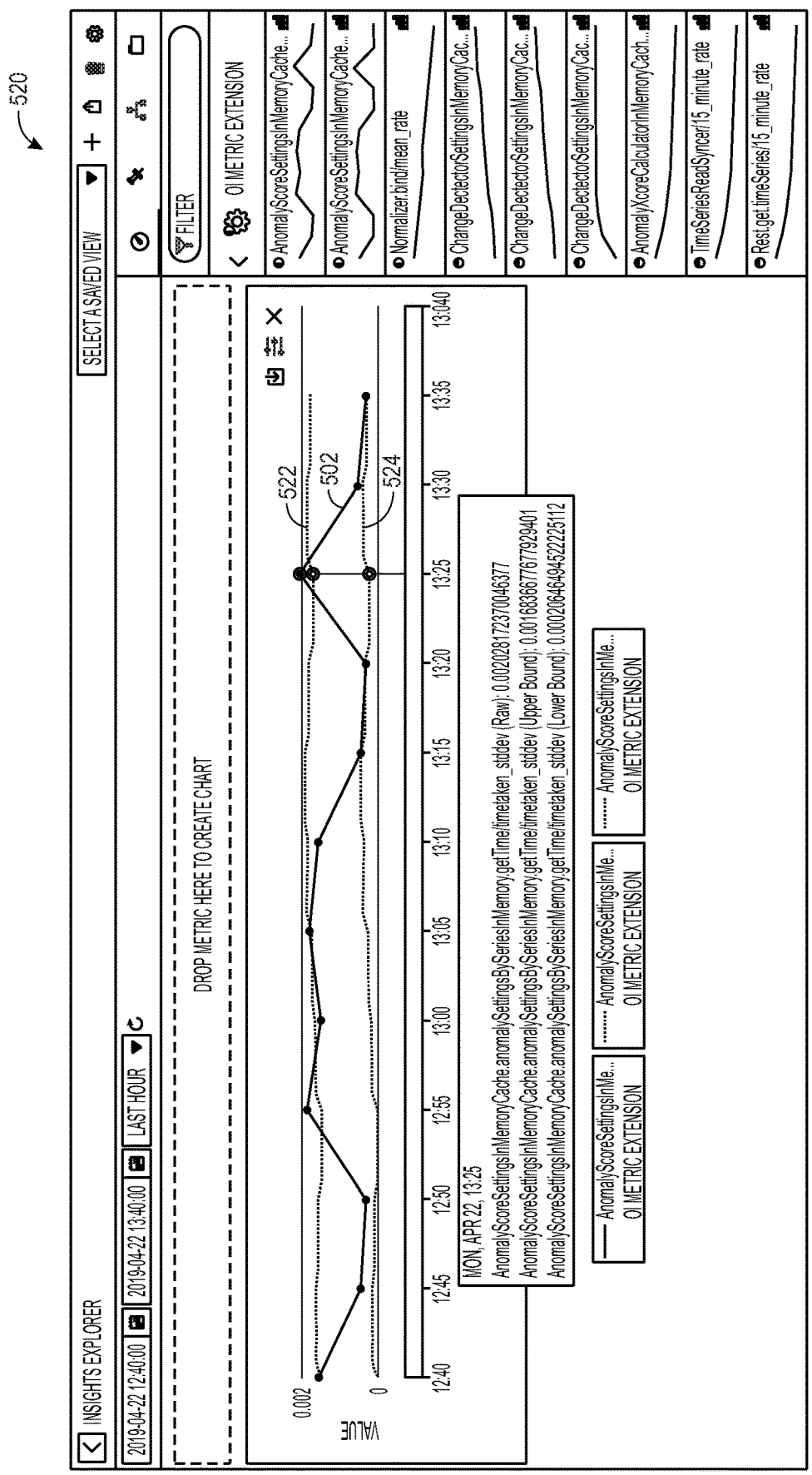
FIG. 10 illustrates an output for metric data associated with a "bounds" anomaly detection action option, in accordance with aspects of the present disclosure.

FIG. 10 illustrates a GUI 520 illustrating an output for metric data associated with a "bounds" anomaly detection action option 472, in accordance with aspects of the present disclosure. Here, metric data 502 is captured and provided, as with the "metrics only" anomaly detection action option 470. However, upper bounds 522 and lower bounds 524 are also calculated and provided for display in the GUI 520. Similar to the "metrics only" anomaly detection action option 470, no anomaly scoring, detection, and alerting is provided for this metric data.

Figure 11:
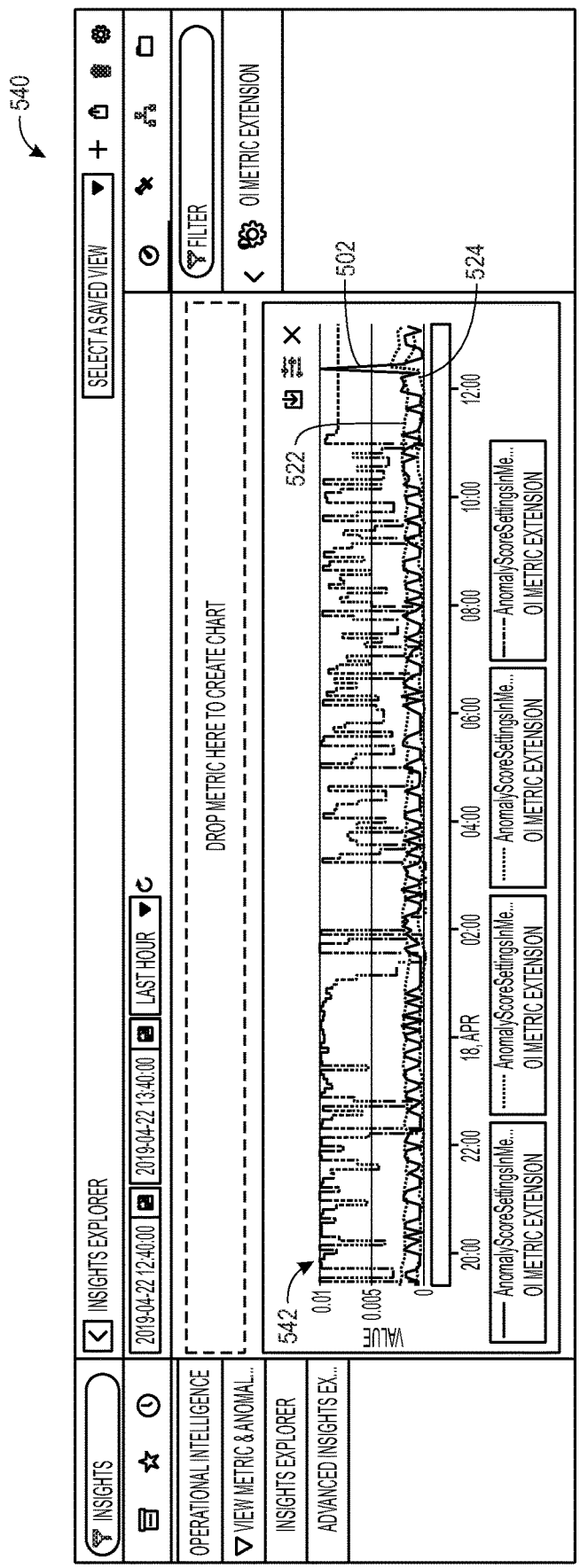
FIG. 11 illustrates an output for metric data associated with an "anomaly scores" anomaly detection action option, in accordance with aspects of the present disclosure.

FIG. 11 illustrates a GUI 540 that provides an output for metric data associated with an "anomaly scores" anomaly detection action option 474, in accordance with aspects of the present disclosure. As illustrated, the GUI 540 provides anomaly scores 542 (along with metric data 502, upper bounds 522, and lower bounds 524. While anomaly scores 542 are generated, the anomaly scores 542 do not result in anomaly alerts or IT alerts.

Figure 12:
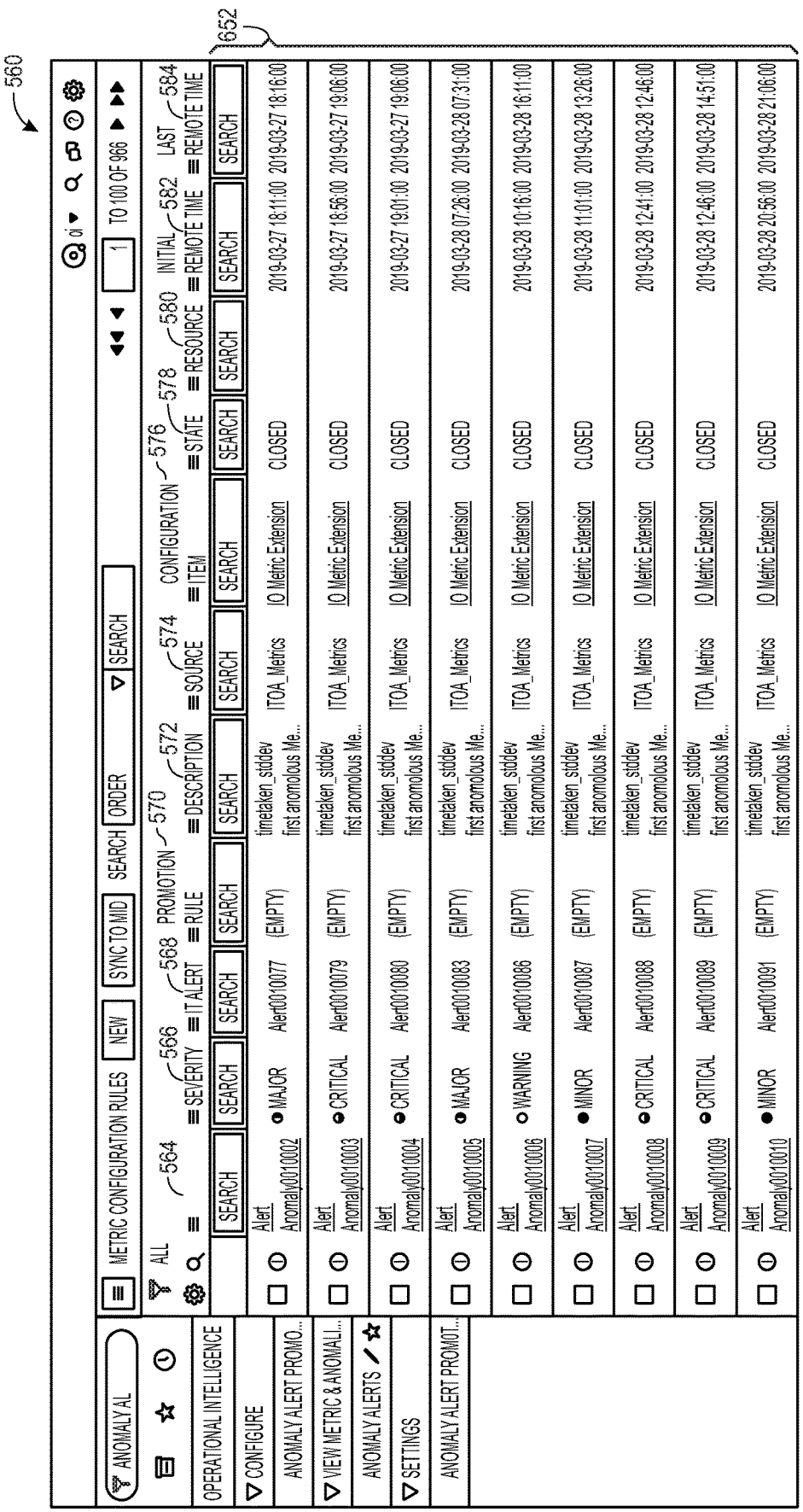
FIG. 12 illustrates an output for metric data associated with an "anomaly alerts" anomaly detection action option, in accordance with aspects of the present disclosure.

FIG. 12 illustrates a GUI 560 that illustrates an output for metric data associated with an "anomaly alerts" anomaly detection action option 476, in accordance with aspects of the present disclosure. The GUI 560 is an anomaly alert GUI that provides a list 562 of anomaly alerts generated by the system. The number field 564 provides a unique identifier for the generated anomaly alert. The severity field 566 illustrates a level of severity of the anomaly, as may be identified by the magnitude of the anomaly score.

In some instances, an anomaly alert may be linked to an IT alert. The IT alert field 568 is used to present this link, when present. The promotion rule field 570 provides the ability to promote the anomaly alert to a higher alert when certain conditions are met. The description field 572 is used to provide a description of the anomaly alert.

As previously mentioned, many sources may provide metric data. The source field 574 provides an indication of the source of the metric data that resulted in the anomaly alert. The configuration item field 576 provides configuration items associated with the anomaly alert. The state field 578 provides an indication of a state of the anomaly alert. For example, the state could be "closed", "open", "new", etc.

The resource field 580 provides resources associated with the anomaly alerts. The initial remote time field 582 provides the initial remote time for the anomaly alert and the last remote time field 584 provides the last remote time for the anomaly alert.

Figure 13:
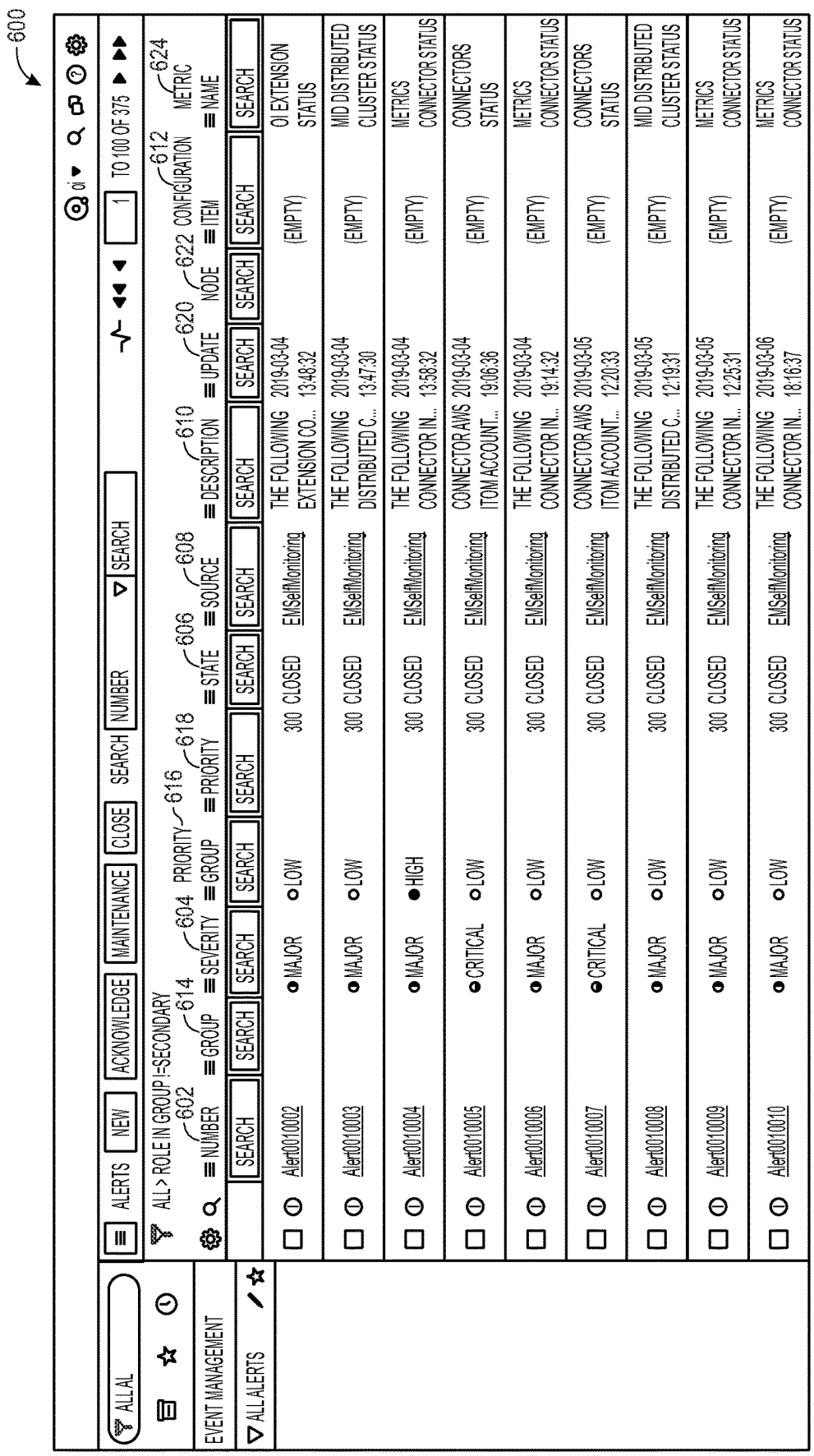
FIG. 13 illustrates an output for metric data associated with an "IT alerts" anomaly detection action option, in accordance with aspects of the present disclosure.

FIG. 13 illustrates a GUI 600 that provides an output for metric data associated with an "IT alerts" anomaly detection action option 478, in accordance with aspects of the present disclosure. The GUI 600 provides a list of IT alerts, which are escalated alerts that provide an indication of events that may need the attention of IT personnel. The IT alert data that is provided may have some overlap with the anomaly alerts. For example, the number field 602 may provide a unique identifier for the IT alert, the severity field 604 may provide a severity associated with the IT alert, the state field 606 may provide a state of the IT alert, the source field 608 may provide a source of the IT alert, the description field 610 may provide an indication of why the IT alert was generated, and the configuration item field 612 may provide an indication of CIs associated with the IT alert.

IT alerts may be grouped. The group field 614 provides an indication of any group association that may exist with regard to the IT alert. The priority group field 616 indicates which alerts should be attended to first by grouping the IT alerts into priorities based upon threshold priority values. The priority field 618 allows for user-defined prioritization of the IT alerts. The updated field 620 provides a timestamp of the last update to the IT alert. The node field 622 provides an indication of nodes associated with the IT alert and the metric name field 624 provides an indication of a metric name associated with the IT alert.

Turning now to a discussion of automatic selection of anomaly detection action options, FIGS. 14 and 15 provide processes for machine selection of the anomaly detection action option for particular metric data. FIG. 14 is a flowchart illustrating a process 640 for using machine learning for assigning anomaly detection action options, in accordance with aspects of the present disclosure. The process 640 is an optional process that, in some embodiments, may be offered when a user optionally opts-in to machine learning based anomaly detection option suggestions.

The process 640 begins by determining machine learning (ML) patterns for anomaly detection action option selections (block 642). For example, supervised or unsupervised machine learning may be used to identify traits of metric data associated with particular anomaly detection action option selections. A determination is made as to whether derived patterns indicate an anomaly action option that may likely be desirable for target metric data (decision block 644). If the patterns do not indicate an anomaly action option that may likely be desirable for the target metric data, the default anomaly detection action may be used. Otherwise, when the patterns do indicate an anomaly action option that may likely be desirable for the target metric data, the indicated anomaly detection action may be automatically selected and used by the machine.

FIG. 15 is a flowchart illustrating a process 660 for assigning anomaly detection action options based upon a model quality, in accordance with aspects of the present disclosure. As may be appreciated, anomaly scores and alert accuracy may vary based upon statistical model quality. Statistical models that do not meet a threshold level of qualitative prediction may result in false alerts and/or false anomaly data. Accordingly, model quality may be used to automatically select certain anomaly detection options.

The process begins by determining a quality of the statistical model associated with current metric data (block 662).

A determination is made as to whether the quality meets a quality pre-determined threshold (decision block 664). If the statistical model does meet the quality threshold, the default or previously selected anomaly detection option may be maintained (block 666). However, if the statistical model does not meet the quality threshold, a non-anomaly detection option may be automatically selected for use as the anomaly detection action. For example, the "metrics only" anomaly detection option 470 may be selected and used by the machine. This may help ensure that lower quality statistical models do not create false alerts, which may be unnecessary distractions for IT personnel.

As may be appreciated, the current techniques provide dynamic anomaly detection action options for different metric data that is captured from an IT environment. By providing a multitude of anomaly detection action options, a customized alert and monitoring system may be achieved, such that lower priority metric data can be treated differently than higher priority metric data, enabling more efficient IT response. In some instances, machine learning and/or statistical model evaluation may aid a machine to automatically determine a proper anomaly detection action for particular metric data.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions that, when executed by one or more processors of the machine, cause the machine to:
    collect metric data corresponding to one or more configuration items of an information technology (IT) infrastructure;
    classify time-series data present in the metric data related to the one or more configuration items of the IT infrastructure;
    generate, based on the classified time-series data, a statistical model used to identify anomalies in the metric data;
    determine a quality of the statistical model use;
    automatically select an anomaly detection action option of a plurality of anomaly detection action options based upon the quality of the statistical model;

perform an action using the metric data based upon the selected anomaly detection action option; and
generate a dashboard graphical user interface (GUI) configured to display results of the action.

2. The tangible, non-transitory, machine-readable medium of claim 1, wherein the selected anomaly detection action option comprises a default option when no overriding options are indicated.

3. The tangible, non-transitory, machine-readable medium of claim 1, wherein the plurality of anomaly detection action options comprise a metric collection option that stores the metric data without performing subsequent anomaly detection actions on the metric data.

4. The tangible, non-transitory, machine-readable medium of claim 1, wherein the plurality of anomaly detection action options comprise a boundary generation option that generates statistical upper bounds and statistical lower bounds for the metric data.

5. The tangible, non-transitory, machine-readable medium of claim 1, wherein the plurality of anomaly detection action options comprise an anomaly score generation option that generates one or more anomaly scores for the metric data, wherein the anomaly scores indicate a magnitude of deviation between the metric data and the statistical model over one or both of multiple measurements of the metric data or a particular time interval.

6. The tangible, non-transitory, machine-readable medium of claim 1, wherein the plurality of anomaly detection action options comprise an anomaly alert generation option that generates anomaly alerts in an anomaly list of the dashboard GUI based on identified anomalies in the metric data, wherein the anomalies are identified based upon one or both of:
a magnitude of outlier data found in the metric data, or
a magnitude of deviation between the metric data and the statistical model over one or both of multiple measurements of the metric data or a particular time interval.

7. The tangible, non-transitory, machine-readable medium of claim 1, wherein the plurality of anomaly detection action options comprise an IT alert generation option that generates IT alerts on an IT view of the dashboard GUI based on identified anomalies in the metric data, wherein the anomalies are identified based upon one or both of:
a magnitude of outlier data found in the metric data, or
a magnitude of deviation between the metric data and the statistical model over one or both of multiple measurements of the metric data or a particular time interval; and wherein the IT view comprises a view that is elevated in importance over an anomaly alert view of the dashboard GUI.

8. The tangible, non-transitory, machine-readable medium of claim 1, where the selected anomaly detection action is set by selecting from a modal list of the plurality of anomaly detection action options in a metric data configuration view of the GUI.

9. The tangible, non-transitory, machine-readable medium of claim 1, wherein the quality of the statistical model is below a quality threshold, resulting in selection of a metric collection option that stores the metric data without performing subsequent anomaly detection actions on the metric data as the selected anomaly detection action option.

10. The tangible, non-transitory, machine-readable medium of claim 1, wherein the quality of the statistical model meets or exceeds a quality threshold, resulting in selection of an alert generation option that generates anomaly alerts based upon a magnitude of deviation between the metric data and the statistical model over one or both of multiple measurements of the metric data or a particular time interval.

11. The tangible, non-transitory, machine-readable medium of claim 1, comprising machine-readable instructions that, when executed by the one or more processors, cause the machine to:
identify, via machine learning, patterns that indicate a particular anomaly detection action option to use for the metric data; and
automatically select the particular anomaly detection action option as the selected anomaly detection action option.

12. The tangible, non-transitory, machine-readable medium of claim 1, wherein the quality of the statistical model is indicative of an ability of the statistical model to accurately identify the anomalies.

13. The tangible, non-transitory, machine-readable medium of claim 12, comprising machine-readable instructions that, when executed by the one or more processors, cause the machine to:
automatically select the anomaly detection action option of the plurality of anomaly detection action options based upon a comparison of the quality of the statistical model to a qualitative threshold.

14. The tangible, non-transitory, machine-readable medium of claim 1, wherein automatically selecting the anomaly detection action option of the plurality of anomaly detection action options comprises automatically selecting the anomaly detection action option of the plurality of anomaly detection action options based on a priority of the metric data.

15. A computer-implemented method, comprising:
collecting metric data corresponding to one or more configuration items of an information technology (IT) infrastructure;
classifying time-series data present in the metric data related to the one or more configuration items of the IT infrastructure;
generating, based on the classified time-series data, a statistical model used to identify anomalies in the metric data;
determining a quality of the statistical model;
automatically selecting an anomaly detection action option of a plurality of anomaly detection action options based upon the quality of the statistical model;
performing an action using the metric data based upon the selected anomaly detection action option; and
generating a dashboard graphical user interface (GUI) configured to display results of the action.

16. The computer-implemented method of claim 15, comprising:
using a default option as the selected anomaly detection action option when no overriding options are indicated.

17. The computer-implemented method of claim 15, wherein the plurality of anomaly detection action options comprise:
a metric collection option that stores the metric data without performing subsequent anomaly detection actions on the metric data;
a boundary generation option that generates statistical upper bounds and statistical lower bounds for the metric data;
an anomaly score generation option that generates one or more anomaly scores for the metric data, wherein the anomaly scores indicate a magnitude of deviation between the metric data and the statistical model over multiple measurements of the metric data, over a particular time interval, or both;

an anomaly alert generation option that generates anomaly alerts in an anomaly list of the dashboard GUI based on identified anomalies in the metric data, wherein the anomalies are identified based upon one or both of:

a magnitude of outlier data found in the metric data, or a magnitude of deviation between the metric data and the statistical model over one or both of multiple measurements of the metric data or a particular time; and an IT alert generation option that generates IT alerts on an IT view of the dashboard GUI based on identified anomalies in the metric data, wherein the anomalies are identified based upon one or both of:

a magnitude of outlier data found in the metric data, a magnitude of deviation between the metric data and the statistical model over one or both of multiple measurements of the metric data or a particular time interval; and wherein the IT view comprises a view that is elevated in importance over the anomaly list of the dashboard GUI.

18. The computer-implemented method of claim 15, comprising:

identifying, via machine learning, patterns that indicate a particular anomaly detection action option to use for the metric data, and automatically selecting the particular anomaly detection action option as the selected anomaly detection action option.

19. A cloud-based infrastructure comprising:

a distributed computer system configured to:

collect metric data corresponding to one or more configuration items of the cloud-based infrastructure;

classify time-series data present in the metric data related to the one or more configuration items of the cloud-based infrastructure;

generate, based on the classified time-series data, a statistical model used to identify anomalies in the metric data;

determine a quality of the statistical model;

automatically select an anomaly detection action option of a plurality of anomaly detection action options based upon the quality of the statistical model;

perform an action using the metric data based upon the selected anomaly detection action option; and generate a dashboard graphical user interface (GUI) configured to display results of the action.

* * * * *